United States Patent [19]

Shimizu

[11] Patent Number: 4,933,200
[45] Date of Patent: Jun. 12, 1990

[54] PROCESSING METHOD FOR MEAT
[75] Inventor: Yasuhiro Shimizu, Isehara, Japan
[73] Assignee: Toshin Technical Co., Ltd., Kanagawa, Japan
[21] Appl. No.: 322,809
[22] Filed: Mar. 13, 1989
[30] Foreign Application Priority Data
  Dec. 12, 1988 [JP] Japan .................... 63-313500
[51] Int. Cl.$^5$ ............................. A23L 1/315
[52] U.S. Cl. ................... 426/510; 426/511; 426/523
[58] Field of Search ............ 426/510, 511, 523, 644
[56] References Cited
  U.S. PATENT DOCUMENTS
  992,488  5/1911  Epler ............................. 426/510
  3,316,829 5/1967 Foldenauer ..................... 426/510

FOREIGN PATENT DOCUMENTS
  49-14657  2/1974  Japan .
  49-30556  3/1974  Japan .

Primary Examiner—George Yeung
Attorney, Agent, or Firm—Guy W. Shoup; Norman R. Klivans

[57] ABSTRACT

A method for processing meat from fowl is disclosed wherein a tough meat is subjected to dry steam at a pressure in the range of about 0.2 Kg/cm$^2$ to about 0.5 Kg/cm$^2$, said steam having a temperature in a range of 100° C. to 130° C. for a period of about 30 minutes to one hour. This method advantageously provides meat which is tender but not wrinkled and does not have peeling of the skin.

1 Claim, 1 Drawing Sheet

PROCESSING METHOD FOR MEAT

BACKGROUND OF THE INVENTION

FIELD OF THE INVENTION

This invention relates to a processing method for meat and more particularly to a processing method for meat in which a tough meat (for example abandoned hen) is changed to a roasted soft meat.

RELATED ART STATEMENT

In the conventionally employed processing method for meat, there are so far proposed a variety of methods, as typified by Japanese Patent Publication Nos. 49-30556 and 49-14657.

In these publications, said tough meat is boiled in a boiler of high pressure 0.7 Kg/cm$^2$~2.1 Kg/cm$^2$, and a boiling time is about from 30 minutes to one hour.

In the above described processing method for meat, the following problems were presented.

Though said tough meat is processed under said high pressure 0.7 Kg/cm$^2$~2.1 Kg/cm$^2$, a wrinkling of skin, a peeling of skin, a breakage of skin are caused, and a meat there of is wrinkled, whereby a meat is not preferably softened and value as a commodity becomes lower.

OBJECT AND SUMMARY OF THE INVENTION

In view of these drawbacks of the prior art processing, it is a principal object of the present invention to provide a processing method for meat in which a tough meat (for example abandoned hen) is changed to a roasted soft meat.

A processing method for meat according to the present invention comprises first process for feeding a meat into a steam boiler, a second process for feeding dry steam into said steam boiler from a boiler, whereby said meat is processed by steam processing.

In the processing method for meat of the present invention, it is possible to restore said tough meat, such as abandoned hen, quail and other animal meat as a soft material having a high commodity value for a roasted chicken and fried chicken, whereby a value for saving energy is not estimated exactly.

EMBODIMENT OF THE INVENTION

A preferred embodiment of the processing method for meat of the present invention will be hereafter explained by referring to the accompanying drawings.

First of all, for example, feeding an abandoned tough meat 1 such as a hen or quail having a bone into a low pressure boiler 2, and dry steam which is fed from a boiler 3, whereby said tough meat 1 is heated and processed to a soft meat by said dry steam.

Referring now to a preferred embodiment of processing said tough meat by said boiler as follows:

Pressure for a low pressure boiler is about from 0.2~0.5 Kg/cm$^2$.

Temperature for dry steam is 100°~130° C.

Heated processing time is about from 30 minutes to one hour.

By way of processing said tough meat according to said preferable embodiment, the fat in said tough meat is melted and is expelled from said low pressure boiler 2 after opening a door 8.

According to our experiment, it is possible to make a roasted chicken and fried chicken having a very good taste by using said processed meat and the fat, and it is acknowledged that said processed meat is better tasting than a roasted chicken made by used a fresh and young hen or quail.

Figure 1:
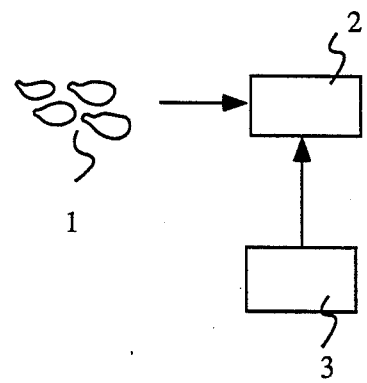
FIG. 1 is a block diagram for showing a process method for meat.
Figure 2:
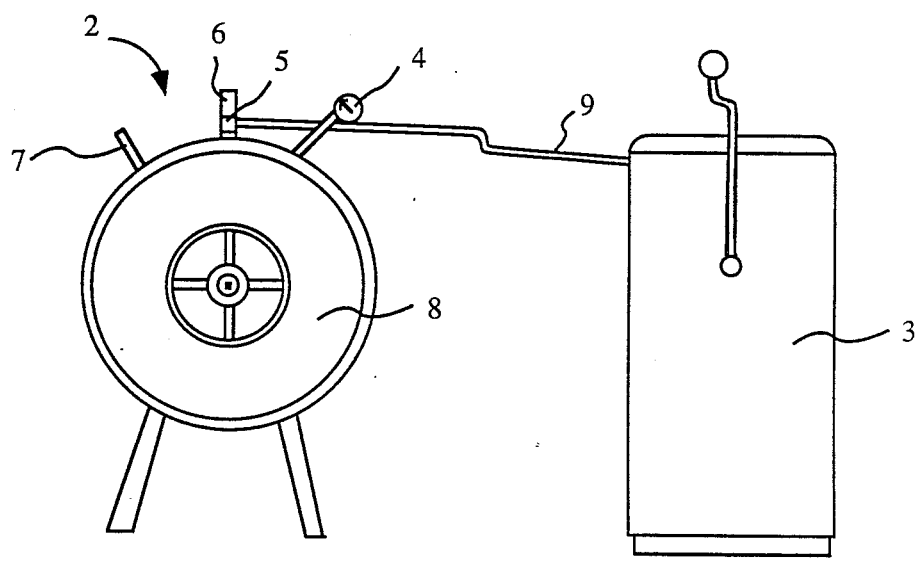
FIG. 2 is a side view for showing a low pressure boiler and boiler for use in this process of the present invention.

Further, referring now to a processing system of the present invention, as shown in FIG. 2, a pressure meter 4, a dry steam feeding portion 6 having a safety valve 5 and a temperature meter 7 are mounted on said low pressure boiler 2, an opening and closing of a door 8 are controlled by a handle 9.

Further, dry steam of certain pressure from said boiler 3 is fed to said low pressure boiler 2 via a feeding pipe 9.

What is claimed is:

1. A method for processing meat from fowl comprising the steps of:
   placing the meat in a boiler; and
   feeding dry steam to the boiler and heating the meat with the dry steam at a pressure in the range of about 0.2 Kg/cm$^2$ to about 0.5 Kg/cm$^2$, said steam having a temperature in a range of 100° C. to 130° C. for a period of about 30 minutes to one hour.

* * * * *